United States Patent [19]

Dykstra et al.

[11] 3,920,592

[45] Nov. 18, 1975

[54] METHOD FOR PRODUCING PAPER COATING BINDER INVOLVING GRAFTING UNSATURATED ACRYLATE MONOMERS ONTO PROTEINACEOUS SUBSTRATE IN WATER

[75] Inventors: Gerald M. Dykstra, Round Lake; Rabon L. Hollingsworth, Hoffman Estates, both of Ill.

[73] Assignee: Central Soya Company, Inc., Fort Wayne, Ind.

[22] Filed: Aug. 1, 1973

[21] Appl. No.: 384,582

[52] U.S. Cl. ............... 260/8; 260/174 GC; 427/391; 48/511
[51] Int. Cl.² ........................... C08F 289/00
[58] Field of Search ............ 260/8, 174 GC

[56] References Cited
UNITED STATES PATENTS

| | | | |
|---|---|---|---|
| 2,605,242 | 7/1952 | Betts et al. | 260/8 |
| 2,754,240 | 7/1956 | Kinney | 260/8 |
| 3,138,564 | 6/1964 | Borunsky | 260/8 |
| 3,313,749 | 4/1967 | Ready | 260/8 |
| 3,480,455 | 11/1969 | Richardson | 260/8 |
| 3,651,210 | 3/1972 | Shepler | 260/8 |

FOREIGN PATENTS OR APPLICATIONS

| | | | |
|---|---|---|---|
| 545,084 | 8/1957 | Canada | 260/8 |

OTHER PUBLICATIONS

Chemical Abstracts — Vol. 64, 1966 — Entry 18767h, Khismatullina et al.

Film—Forming Composition—Pat. II—Vol. I—Eds. Myers—Long—Dekker—N.Y.—1968—85—105.

*Primary Examiner*—Melvin Goldstein
*Assistant Examiner*—Peter Kulkosky
*Attorney, Agent, or Firm*—Dawson, Tilton, Fallon & Lungmus

[57] ABSTRACT

A paper coating and method of preparation which includes a pigment and as the binder, mechanically stable aqueous proteinaceous graft polymers of soy protein, styrene and an alkyl acrylate or alkyl methacrylate which have improved adhesive properties when compared to mixed adhesive systems of natural polymeric adhesives and synthetic polymeric systems.

1 Claim, No Drawings

METHOD FOR PRODUCING PAPER COATING BINDER INVOLVING GRAFTING UNSATURATED ACRYLATE MONOMERS ONTO PROTEINACEOUS SUBSTRATE IN WATER

BACKGROUND AND SUMMARY OF INVENTION

This invention relates to improved adhesive compositions and methods for making the same. More particularly, this invention relates to adhesive compositions for use as binders in the manufacture of coated paper and paperboard.

The coating of webs, such as cellulosic webs, is considered essential in quality printing for the proper application of ink. The two major components are a pigment (viz., a clay) and a binder. The goal of the art is to minimize the expense of handling and applying the binder portion of the coating.

We have found that an emulsion binder system which employs a protein graft polymer has unexpected and desirable advantages over previously employed binders, not only as to functional properties but also insofar as materials handling is concerned. The inventive binder is an aqueous proteinaceous graft polymer containing styrene and an alkyl acrylate or methacrylate and is formed by the emulsion polymerization of a suitable proteinaceous material, styrene and an alkyl acrylate or alkyl methacrylate.

SCOPE OF THE INVENTION

The proteinaceous graft polymers are prepared by emulsion polymerization. In the polymerizations, (1) protein-aceous material, e.g., soy protein, casein, collagen, gelatin, etc., (2) styrene, (3) an acrylate or alkyl methacrylate (where the alkyl group has 1–10 carbon atoms) or combination thereof and, optionally, a seed polymer emulsion, are emulsified in an aqueous medium having a pH between about 3.5 and 13. A free radical precursor or initiator is incorporated in the proteinaceous material dispersion prior to monomer addition and heated to decompose the precursor and release free radicals which initiate graft polymerization of the monomers within the emulsion. It has been found that the graft polymerizations of dispersed proteinaceous material with styrene and certain alkyl acrylates or methacrylates either alone or in the presence of a seed polymer emulsion result in product emulsions having the desired balance of properties for use as paper coating binders.

The proteinaceous graft substrate material for the graft polymers can be chosen from several physical forms of protein. Dry, granular isolated soy protein or casein can be redispersed in water using a dispersing agent. For improved economy, soy protein may also be used in the form of a curd or protein-containing liquor. The amount of proteinaceous material in the graft polymer is maintained from about 0.01 to about 67 weight percent of the graft polymer on a dry basis.

The alkyl acrylate or methacrylate may be chosen from the following class: methyl, ethyl, propyl, isopropyl, n-butyl, isobutyl, 2-ethylhexyl, n-hexyl, n-octyl, nonyl, n-decyl and isodecyl acrylate or methacrylate, i.e., an ester having from 1–10 carbon atoms in the alkyl group. These monomers are cited for example only, and should not be construed as limits of this invention. Both the styrene monomer and alkyl acrylate or methacrylate should be inhibitor free or contain low levels of inhibitor which can be removed by distillation or by washing.

The seed emulsion comprises an aqueous emulsion of a synthetic polymeric emulsion such as polyvinyl acetate homopolymers and multipolymers, alkyl acrylate and methacrylate homopolymers and multipolymers, styrene-butadiene polymers and polyvinyl chloride and polyvinylidene chloride homopolymers and multipolymers. These seed polymer emulsions may be prepared in the laboratory or selected from commercially available materials.

The chemical structure of the emulsion polymer chosen as a seed for proteinaceous graft polymer adhesives has an effect on the overall properties of the graft polymers and also affects the functional properties of coated paper and paperboard. The seed polymer emulsion should be a reasonably good adhesive when used by itself. Current theory has been advanced to the point where electron microscopy has shown that the particles of all-synthetic aqueous emulsion polymers seeded with another preformed aqueous all-synthetic emulsion polymer under proper polymerization conditions are overcoated in a core-shell manner.

The choice of a seed polymer for the present invention is especially influenced by the desired functional properties of the coated paper and paperboard; especially gloss, brightness, opacity, gloss ink holdout and adhesive strength. The seed polymers should have a glass transition temperature similar to the polymer system to be seeded, and also should have an average particle size suitable for emulsion polymerization. The seed polymer should be mechanically stable either over a very wide range of pH (3.5 to 13), or especially in the pH range chosen for practice of the present invention.

The graft polymerization reaction in both the unseeded and seeded emulsion forms of the invention to be described herein is initiated by a water-soluble free radical initiator such as a water-soluble peracid or salt thereof, e.g., hydrogen peroxide, sodium peroxide, lithium peroxide, peracetic acid, persulfuric acid of the ammonium and alkali metal salts thereof, e.g. ammonium persulfate, sodium peracetate, lithium persulfate, pottassium persulfate, sodium persulfate, etc. A suitable concentration of the initiator is from about 0.001 to about 10.0 weight percent based on each of the monomers in the emulsion. The free radical initiator can be used alone and thermally decomposed to release the free radical initiating species, or can be used in combination with a suitable redox couple. Although a number of suitable redox initiator systems are available for use in emulsion polymerization, few are used due to a number of drawbacks associated with such systems. Some of these problems are excessive color development in finished polymers, excessive homopolymerization in multipolymer systems if reaction conditions are not controlled closely, degradation of the substrate polymer backbone, and similar problems. Proteinaceous graft polymer adhesives can be made with good yield by using an aqueous redox initiator system such as ferrous ion and hydrogen peroxide or ferrous ion and persulfates. Also useful are mixtures of sodium bisulfite and persulfates or sodium hydrosulfite and persulfates in conjunction with a small amount of activating metal ion and optionally a bicarbonate buffer.

POLYMERIZATION PROCEDURES

Various emulsion polymerization techniques can be employed to obtain the inventive graft polymers. However, it is preferred to conduct the polymerization reaction with a delayed monomer and initiator addition process using a kettle and stirrer to maintain intimate mixing of the emulsified reactants. The polymerization is begun by charging water into the vessel. The protein substrate is then added as a dry powder, curd or in its protein-containing liquor form. If the protein substrate is added as a dry powder, the material should be allowed to swell for 5 to 15 minutes with continuous stirring before it is dispersed with a dispersing or cutting agent. The cutting agent may be chosen from various known cutting agents for protein with sodium hydroxide and ammonium hydroxide being preferred. A curd-type protein may also be dispersed in the same manner. The pH of the dispersed protein may be varied over a wide range of pH from 3.5 to 13 with the preferred range of pH 5 to 12. When ammonium hydroxide is used as the cutting agent, the preferred range of pH is 6 to 10.5.

To insure removal of oxygen, the reactor may be purged with an inert gas at the start of the reaction and during the reaction. While this step is not absolutely necessary, it has been found that the graft polymerization is more efficient if the reactor is purged. The purge referred to in the examples is effective to maximize conversion, but is not essential for the practice of the invention, particularly under commercial conditions. Elimination of the purge may result in a slightly reduced conversion.

After the reactor is purged, it can then be charged with a portion of the initiator, all or a portion of the seed polymer emulsion, a portion of the styrene monomer and a portion of the alkyl acrylate or methacrylate monomer and agitated to form an aqueous emulsion. The monomers may be mixed before addition or added separately.

A portion of the polymerization initiator is charged to the reactor in an amount effective for initiating polymerization, e.g., from about 0.001 to about 10.0 weight percent based on the total of each of the monomers maintained therein, and the reactor is heated to a temperature of from 20°C. to 95°C. and preferably between 30°C. and 90°C. to initiate the reaction. The initiator and reactants are stirred sufficiently to thoroughly agitate the contents of the reactor and to maintain the solids emulsified in the aqueous solution.

It will also be appreciated that depending upon various factors, i.e., temperature, concentration, etc., the time allowed for thermal decomposition of the free radical precursor may be varied substantially — from an order of a few minutes up to somewhat under an hour. In like fashion, the time of addition of the monomers and initiator may be varied as from a few minutes to several hours, and in analogous fashion the temperature varied from about 40°C. to about 75°C. The determination of the temperature to be maintained during conversion can be a matter of commercial economics. However, the addition of the monomer and the initiator is regulated so as to prevent undue temperature increase due to the lack of control over the exothermic nature of the reaction which, if not regulated, would result in graft polymers with higher viscosity and lower molecular weight than desired.

The amount of seed emulsion charged to the reactor will vary over a wide range depending upon the reaction conditions and the selected graft polymer contents. Generally, the amount of seed emulsion ranges from about 0.01 to about 50 weight percent of the graft polymer. It has been found, for example, that an improved adhesive can be prepared when a seed emulsion of from 0.1 to 40 weight percent of the graft polymer is employed. The amount of styrene and alkyl acrylate or methacrylate initially charged to the reactor is dependent upon the desired solids content of the emulsion, but generally ranges from about 0.01 to about 40 weight percent of the finished emulsion solids. The amount of styrene and alkyl acrylate or methacrylate charged to the reactor at later stages of polymerization is further dependent upon the amount and type of seed polymer emulsion which is employed.

It is preferred that the portion of styrene monomer initially charged to the reactor be an amount from 0.01 to 17 weight percent of the graft polymer. It is also preferred that the portion of alkyl acrylate or methacrylate monomer initially charged to the reactor be an amount from 0.01 to 17 weight percent of the graft polymer, and that the remaining portions of the styrene monomer and alkyl acrylate or methacrylate monomer be slowly charged to the reactor during the polymerization reaction so that substantial monomer grafting may occur on the protein substrate and initially formed copolymers. In this manner, it is possible to obtain graft polymers in the final emulsion having a particle size from about 0.05 microns to 0.25 microns. The graft polymerization of styrene and an alkyl acrylate or methacrylate on a proteinaceous substrate polymer is conducted so that the amount of styrene in the polymer is maintained from about 1 to about 45 weight percent, and preferably between about 16 and 34 weight percent of the graft polymer. The amount of alkyl acrylate or methacrylate in the polymer is maintained from about 1 to about 45 weight percent, and perferably between about 16 and 34 weight percent of the graft polymer.

In a particularly preferred embodiment of the above polymerization procedure, the solids content in the reactor after the addition of the seed polymer emulsion to the aqueous protein substrate solution is adjusted to between about 0.01 and 31 weight percent prior to the addition of the initiator. Styrene and alkyl acrylate or methacrylate are concurrently introduced into the reactor at slow addition rates after the aforementioned initial charge of initiator and monomers, i.e., between about 90% and 5% of the total amount of each additive and monomer is charged to the reactor per hour until all the initiator, styrene, and alkyl acrylate or methacrylate are charged into the reactor.

The total amount of protein substrate, styrene, alkyl acrylate or methacrylate and seed polymer emulsion is selected so that the graft polymer has a solids content between about 2 and 60 weight percent in order to realize a product having the desired viscosity and solids content. The graft polymer emulsions described in the present invention may be concentrated by appropriate means to obtain emulsions of high solids content. After initiation of the reaction, the temperature of the emulsion can be maintained over a wide range of temperature from 20°C. to 100°C. and preferably between 50°C. and 95°C. and held at the selected temperature by circulating a liquid around the exterior of the reactor. Preferably the styrene and alkyl acrylate or methacrylate is concurrently and slowly charged to the reactor with the proper amount of initiator after the emulsion temperature is maintained between 60°C. and 85°C. When a redox agent is employed, the initiation and polymerization reaction can be conducted at lower temperatures and accordingly the reaction can be conducted at temperatures between 45°C. and 75°C.

The graft polymerization reaction is conducted until the combined free monomers content in the emulsion is less than 1 weight percent and preferably less than 0.5 weight percent. If the free monomer content is higher than the above concentrations after a reaction period of about 1 to 9 hours, an additional amount of initiator can be charged to the reactor and allowed to react to reduce the monomer content or, alternatively, the reaction temperature can be increased. The reactor is then cooled and the inert gas purge is stopped, if used.

DETAILED DESCRIPTION

The invention can be better appreciated from a consideration of the following examples.

EXAMPLE I

In this example, a series of unseeded graft polymer preparations are described to illustrate the utility of a class of alkyl acrylates and alkyl methacrylates used in conjunction with styrene to demonstrate the effectiveness of the graft polymers as adhesive compositions. The substrate protein for these polymers was a commercial isolated soy protein, DELTA Protein (low viscosity grade), an alkaline modified isolated soy protein marketed by Central Soya Company. To prepare the graft polymer, we used a 2 liter glass reactor equipped with a drive assembly, stirrer, condenser, nitrogen purge tube and additional funnels assembled and mounted in a constant temperature bath. This was charged with 942 grams of deionized water followed by a nitrogen gas purge which continued throughout the reaction. Initially, the purging rate was about one liter per minute to flush air out of the system and thereafter the rate was reduced to about one-half liter per minute. 150g. of DELTA Protein (dry basis) was added and allowed to thoroughly wet out for 5 minutes at about 25°C. Then, 21 g. 28% aqua ammonia was added. The materials were stirred at a rate sufficient to maintain dispersion of the reactants and maintained at 58°C.–60°C. for 30 minutes. Then one-third of the ammonium persulfate initiator solution was added. This solution was a solution of reagent grade of ammonium persulfate and distilled water. To prepare this solution we dissolved 4.5 g. persulfate (3% based on the total weight of the combined monomers) in 90 ml of distilled water which previously had been boiled and cooled to rid it of any entrapped air. In the event sodium hydroxide is used as the cutting agent in place of the aqua ammonia specified previously, we find it advantageous to make use of 5% ammonium persulfate based on the weight of the combined monomers.

The reactor temperature was increased to 65°–75°C. to initiate thermal decomposition of the free radical precursor, i.e., the ammonium persulfate. After about 30 minutes, 25 g. of each monomer, styrene and n-butyl acrylate, was added by the batch method to the reactor. The 25 g. constituted one-third of the total charge of each monomer. The reaction was allowed to proceed for about 40 minutes at 68°–75°C. After this initial reaction period, the remaining styrene and n-butyl acrylate were added continuously at a rate which allowed the temperature of the reaction to be maintained at about 68°–75°C. Simultaneously with the monomer addition, the rest of the initiator solution was added at a rate which allowed monomer and initiator addition to be completed at approximately the same time. After the monomer and initiator addition was complete, the reaction was allowed to proceed until less than 1% free monomer remained, a time of approximately 90 minutes. At this time, the reactor was cooled and the graft polymer dispersion removed. The solids content of the resultant graft polymer was about 20%.

A paper coating composition making use of this graft polymer was then prepared. For that purpose we used 100 g. of HYDRAFINE clay (commercial coating clay marketed by J. M. Huber Co.) and a binder system of 7 g. (dry basis) of the graft polymer and 7 g. (dry basis) of Dow 620 Latex marketed by Dow Chemical Co. The graft polymer coatings were prepared at approximately 45% solids in the following manner:

The following ingredients were added to a Waring Blendor:

|  | wet g. | dry g. |
|---|---|---|
| Water | 30 | — |
| Hydrafine Clay | 100 | 100 |
| Mixed for 15 minutes, then added |  |  |
| Water | 74 | — |
| Protein Graft Polymer (at 20% solids) | 35 | 7 |
| Ammonia to pH 9.0 to 10.5 Mixed for 5 minutes, then added | 1.2 | — |
| Dow Latex 620 (at 50% solids) Mixed for 5 minutes, and then screened 100 mesh | 14 | 7 |

For purpose of comparison, two control coatings were prepared at about 45% solids in the following manner:

|  | Control (1) 14 g. DELTA | | Control (2) 7g. DELTA 7g. Dow 620 | |
|---|---|---|---|---|
|  | wet g. | dry g. | wet g. | dry g. |
| Protein Dispersion (size): |  |  |  |  |
| Water at room temperature | 67.8 | — | 33.9 | — |
| DELTA protein | 14 | 14 | 7 | 7 |
| This was wetted out for 5 minutes with occasional stirring, then we added |  |  |  |  |
| Ammonia (26°Be) and heated to 60°C. and held for ½ hour with occasional stirring | 2.24 | — | 1.12 | — |

The coating color was then prepared in a Waring Blendor as follows:

| Water | 30 | — | 30 | — |
|---|---|---|---|---|
| Hydrafine Clay | 100 | 100 | 100 | 100 |
| Mixed for 15 minutes, then added |  |  |  |  |
| Water | 39.9 | — | 67.3 | — |
| Size | 84 | 14 | 42 | 7 |
| Mixed for 15 minutes, then added |  |  |  |  |
| Dow Latex 620 (at 50% solids) Mixed for 5 minutes, and then screened 100 mesh | — | — | 14 | 7 |

The coating colors were then applied to 75g. per square meter basis weight precoated base stock using a Mayer rod to obtain coat weight of 18 to 22g. per square meter. Then the coated base stock was oven-dried at 60°C. for 10 minutes, super-calendered at a lineal pressure of about 20kg. per cm., and conditioned at 21°C. to 22°C.

and 50% relative humidity for at least three hours before testing.

Substantially the same procedure was followed to prepare graft polymer dispersions with other acrylate or methacrylate monomers as shown in Table I below. In each case the weight of the protein substrate was 50% and each of the monomers 25%, i.e., 150 grams of protein, 75 grams of styrene and 75 grams of the other monomer, respectively.

Table I

| Batch No. | Other Monomer |
|---|---|
| 1 | Methyl acrylate |
| 2 | Ethyl acrylate |
| 3 | Methyl methacrylate |
| 5* | 2-Ethylhexyl acrylate |
| 6 | n-Hexyl acrylate |

*Batch 4 employed n-butyl acrylate as the other polymer. In each case, certain advantageous results were obtained when each protein graft polymer was used as a coating binder. The specific results are seen below in Table II in terms of various accepted criteria for the evaluation of coating colors and coated paper and paperboard, viz., Brookfield viscosity, 75° Gardner gloss, G.E. brightness, Dennison wax pick, I.G.T. printability and K & N ink holdout. These criteria are described in detail in TAPPI standards.

coating adhesives, especially those of the styrene-butadiene class and acrylic multipolymer class. For the unseeded graft polymers described in Example I, an amount of synthetic latex varying from 1 to 99 weight percent of the total adhesive used is added as part of the dual binders. Preferably from 5 to 90 weight percent of the synthetic latex combined with the unseeded graft polymers yields excellent adhesive strength and other well-balanced functional properties in coated paper and paperboard. However, it is preferred to use seeded graft polymers as described in Example II. These seeded graft polymers develop excellent adhesive strength either when used as single binders in paper and paperboard coatings or when used in mixed binder systems as in Example I.

EXAMPLE II

In this example, a series of preparations are described to illustrate the utility of using a seed polymer emulsion to increase the effectiveness of the graft polymers as adhesive compositions, particularly for use as single binders in coating compositions for paper and paperboard. The procedure followed was the same as that

TABLE II

Trial A - Unseeded Graft Polymers

| Monomers tested in conjunction with Styrene | | | (2) Ethyl Acrylate | (3) Methyl Methacrylate | (4) n-Butyl Acrylate | (5) 2-Ethylhexyl Acrylate |
|---|---|---|---|---|---|---|
| Binder System | Control (1) 14 pts DELTA | Control (2) 7 pts DELTA 7 pts Dow 620 | 7 pts Polymer 7 pts Dow 620 | 7 pts Polymer 7 pts Dow 620 | 7 pts Polymer 7 pts Dow 620 | 7 pts Polymer 7 pts Dow 620 |
| Brookfield Viscosity (CPS at 32°C and 100 RPM) | 480 | 197 | 112 | 356 | 144 | 304 |
| Gardner 75° Gloss (Calendered) | 63.7 | 68.7 | 66.2 | 68.0 | 66.4 | 62.7 |
| G.E. Brightness | 75.9 | 75.6 | 77.5 | 74.8 | 76.7 | 75.6 |
| Dennison Wax Pick | 8.0 | 5.9 | 5.2 | 5.4 | 6.0 | 6.4 |
| I.G.T. (cm/sec) Printability | 78 | 73 | 57 | 38 | 84 | 91.5 |
| % K & N Ink Holdout | 75.5 | 76.0 | 71.7 | 82.6 | 75.2 | 85.2 |

Trial B - Unseeded Graft Polymers

| Monomers tested in conjunction with Styrene | | | (6) n-Hexyl Acrylate | (1) Methyl Acrylate |
|---|---|---|---|---|
| Binder System | Control (1) 14 pts DELTA | Control (2) 7 pts DELTA 7 pts Dow 620 | 7 pts Polymer 7 pts Dow 620 | 7 pts Polymer 7 pts Dow 620 |
| Brookfield Viscosity (CPS at 32°C and 100 RPM) | 289 | 148 | 175 | 205 |
| Gardner 75° Gloss (Calendered) | 61.6 | 67.9 | 65.0 | 65.4 |
| G.E. Brightness | 76.4 | 76.2 | 76.0 | 77.1 |
| Dennison Wax Pick | 7.8 | 6.9 | 6.0 | 5.9 |
| I.G.T. (cm/sec) Printability | 96 | 101 | 110 | 96 |
| % K & N Ink Holdout | 57.0 | 65.9 | 77.4 | 65.2 |

Trials A & B: coated on precoated 51 No. base stock.
Trial A: 45% Hydrafine clay coating. Cowles mill dispersed clay.
Trial B: 45% Hydrafine clay coating. Kady mill dispersed clay.
Trials A & B: Control (1) binder system is all DELTA protein, control (2) binder system is equal parts of DELTA protein and synthetic latex.
Trials A & B: Graft polymers (1), (2), (3), (4), (5), (6) binder systems are equal dry parts graft polymer and synthetic latex.

The unseeded polymers prepared as described in Example I develop maximal adhesive strength when used in conjunction with many commercial synthetic paper-described in Example I except that a seed polymer emulsion was added after the protein dispersion step, and before the initial addition of the aqueous initiator solution. We employed 7.5 weight percent of the total combined weight of both monomers for the seed polymer emulsion. The seed polymer emulsion employed was Dow Latex 620 which is a modified styrene-butadiene polymer emulsion. In each of the batches run hereunder, the DELTA protein constituted 46.25% styrene monomer, 23.125% the other monomer, 23.125%, and the seed polymer emulsion, 7.50%, all by moisture free weight. Six batches were run using the seed polymer emulsion, the other monomers being those identified in Table I above but numbered batches 7–12, and corresponding respectively to batches 1–6. Equally beneficial results were obtained. In fact, in some instances, (see Table III below) superior results were obtained through the use of the seeded graft polymer compositions. Table III presents an evaluation of seeded graft polymer compositions in 45 weight percent clay coating compositions. For the coating colors made from polymers prepared as shown in Example II, the graft polymer was added with enough water to bring the solids content of the coating color to 45 weight percent. Concentrated $NH_4OH$ was added to adjust the pH in a range of 9 to 10.5, and the mixture was agitated until uniformly blended at a speed low enough to avoid excessive air entrapment. Although for the purpose of illustrating the invention our bench-type coatings were limited to about 45% solids, it should be appreciated that in commercial practice the solids may range from about 15% up to a level of about 65 to 67%.

The color was applied to a precoated paper base stock using a Mayer rod to yield cost weights of 18 to 22g. per square meter. The coated base stock was oven-dried at 60°C. for 10 minutes, supercalendered at a lineal pressure of about 20kg. per cm., and conditioned at 21°C. to 22°C. and 50% relative humidity for at least three hours before testing. The results of these tests of the graft polymers, a DELTA protein standard, and a dual physical mixture of a DELTA protein standard plus a styrene-butadiene latex are shown in Table III.

EXAMPLE III

The improvement of an isolated protein by graft polymerization is not limited to isolated soy protein. Casein may also be subjected to graft polymerization conditions with or without a seed polymer emulsion. Casein adhesives prepared by grafting with styrene and an alkyl acrylate such as n-butyl acrylate were prepared with and without a seed polymer emulsion in the same manner as the soy protein graft polymer adhesives described in Example I and II. Testing of the seeded and unseeded casein graft polymers showed results similar to those obtained with soy protein graft polymers. This is shown in Table IV.

EXAMPLE IV

In this example, the use of various types of seed polymer emulsions will be discussed. As shown in Table V, several classes of emulsion polymers have been tested as seed polymers in the preparation of seeded styrene-n-butyl acrylate protein graft polymers prepared according to the procedure given in Example II. Styrene-butadiene polymers, ethylenevinyl acetate polymers and acrylic multipolymers function with varying degrees of effectiveness as seed polymers. Certain functional properties of coated paper and paperboard such as gloss, brightness, flexibility, ink holdout and adhesive strength can be influenced by the choice of seed polymer. This is also shown in Table V.

The coating compositions of this invention can be formulated with finely divided minerals or clays other than those used in the examples. In addition, pigments such as titanium dioxide, blanc fixe, zinc oxide, silicas, and calcium carbonate can be used alone or in mixtures with such clays.

TABLE III

| | Trial C - Seeded Graft Polymers | | | | | |
|---|---|---|---|---|---|---|
| Monomers tested in conjunction with Styrene | | | (8) Ethyl Acrylate | (9) Methyl Methacrylate | (10) n-Butyl Acrylate | (11) 2-Ethyl-hexyl Acrylate |
| Binder System | Control (1) 14 pts DELTA | Control (2) 7 pts DELTA 7 pts Dow 620 | 14 pts Polymer | 14 pts Polymer | 14 pts Polymer | 14 pts Polymer |
| Brookfield Viscosity (CPS at 32°C. and 100 RPM) | 480 | 197 | 296 | 820 | 322 | 655 |
| Gardner 75° Gloss (Calendered) | 63.7 | 68.7 | 63.2 | 64.5 | 63.4 | 62.8 |
| G.E. Brightness | 75.9 | 75.6 | 77.4 | 75.4 | 76.9 | 75.5 |
| Dennison Wax Pick | 8.0 | 5.9 | 5.8 | 6.9 | 6.7 | 6.8 |
| I.G.T. (cm/sec) Printability | 78 | 73 | 37 | 37 | 71 | 75 |
| % K & N Ink Holdout | 75.5 | 76.0 | 62.0 | 79.7 | 75.2 | 88.3 |
| | Trial D - Seeded Graft Polymers | | | | | |
| Monomers tested in conjunction with Styrene | | | (12) n-Hexyl Acrylate | | (7) Methyl Acrylate | |
| Binder System | Control (1) 14 pts DELTA | Control (2) 7 pts DELTA 7 pts Dow 620 | 14 pts Polymer | | 14 pts Polymer | |
| Brookfield Viscosity (CPS at 32°C. and 100 RPM) | 289 | 148 | 377 | | 499 | |
| Gardner 75° Gloss | 61.6 | 67.9 | 60.2 | | 60.3 | |

TABLE III-continued

Trial C - Seeded Graft Polymers

| Monomers tested in conjunction with Styrene | | | (8) Ethyl Acrylate | (9) Methyl Methacrylate | (10) n-Butyl Acrylate | (11) 2-Ethyl-hexyl Acrylate |
|---|---|---|---|---|---|---|
| Binder System | Control (1) 14 pts DELTA | Control (2) 7 pts DELTA 7 pts Dow 620 | 14 pts Polymer | 14 pts Polymer | 14 pts Polymer | 14 pts Polymer |
| (Calendered) | | | | | | |
| G.E. Brightness | 76.4 | 76.2 | 76.0 | | 77.6 | |
| Dennison Wax Pick | 7.8 | 6.9 | 7.0 | | 6.0 | |
| I.G.T. (cm/sec) Printability | 96 | 101 | 98 | | 61.5 | |
| % K & N Ink Holdout | 57.0 | 65.9 | 79.0 | | 62.3 | |

Trials C & D: coated on 75g. per square meter basis weight precoated base stock.
Trial C: 45% Hydrafine clay coating, Cowles Mill dispersed clay.
Trial D: 45% Hydrafine clay coating, Kady Mill dispersed clay.
Trials C & D: Control (1) binder system is all DELTA protein, Control (2) binder system is equal parts DELTA protein and synthetic latex.
Trials C & D: Graft polymers (7), (8), (9), (10), (11), (12) binder systems are the grafts used as single binders.

TABLE IV

Trial E
Comparison of Casein Graft Polymers to Soy Protein and Soy Protein — Latex Mixtures

| Control & Test Polymers | | | Seeded Casein Polymer | Unseeded Casein Polymer |
|---|---|---|---|---|
| Binder System | Control (1) 14 pts DELTA | Control (2) 7 pts DELTA 7 pts Dow 620 | 14 pts Polymer | 14 pts Polymer |
| Brookfield Viscosity (CPS at 32°C. and 100 RPM) | 345 | 158 | 229 | 344 |
| Gardner 75° Gloss (Calendered) | 59.1 | 63.8 | 62.2 | 60.3 |
| G.E. Brightness | 76.7 | 76.5 | 77.9 | 77.8 |
| Dennison Wax Pick | 9.95 | 7.2 | 7.0 | 7.85 |
| I.G.T. (cm/sec) Printability | 115 | 159 | 133 | 157 |
| % K & N Ink Holdout | 81.7 | 70.7 | 62.3 | 69.3 |

Control (1): All DELTA protein binder system.
Control (2): DELTA protein plus styrene-butadiene latex binder system.
Seeded Casein Polymer: Casein graft polymer seeded with styrene-butadiene latex and tested as sole binder.
Unseeded Casein Polymer: Casein graft polymer tested as sole binder.

TABLE V

| Graft Polymer | | | M-14 | M-16 | M-18 | M-22 | M-23 |
|---|---|---|---|---|---|---|---|
| Binder System | Control (1) 14 pts DELTA | Control (2) 7 pts DELTA 7 pts Dow 620 | 14 pts Polymer | 14 pts Polymer | 14 pts Polymer | 14 pts Polymer | 14 pts Polymer |
| Brookfield Viscosity (CPS at 32°C. & 100 RPM) | 428 | 247 | 300 | 281 | 288 | 278 | 326 |
| Gardner 75° Gloss (Calendered) | 60.3 | 67.4 | 61.2 | 63.5 | 62.6 | 62.9 | 62.5 |
| G.E. Brightness | 76.1 | 76.5 | 76.9 | 77.1 | 76.8 | 77.1 | 77.0 |
| Dennison Wax Pick | 9.4 | 7.7 | 7.3 | 7.1 | 7.5 | 7.0 | 7.4 |
| I.G.T. (cm/sec) Printability | 155 | 124 | 140 | 113 | 111 | 123 | 129 |
| % K & N Ink Holdout | 78.1 | 69.3 | 71.2 | 63.6 | 67.1 | 62.6 | 63.8 |

Control (1): All DELTA protein binder system.
Control (2): Equal parts DELTA protein and styrene-butadiene latex (Dow Latex 620) binder system.
M-14: Seeded graft polymer (ethylene-vinyl acetate multipolymer seed, Airflex 100HS) used as the sole binder.
M-16: Seeded graft polymer (styrene-butadiene polymer seed, Genflo 5057) used as the sole binder.
M-18: Seeded graft polymer (styrene-butadiene polymer seed, Dow Latex 620) used as the sole binder. M-22: Seeded graft polymer (alkali-swellable styrene-butadiene polymer seed, Dow Latex 650) used as the sole binder. M-23: Seeded graft polymer (alkali-swellable acrylic multipolymer seed, Rohm & Haas Latex AR-74) used as the sole binder. NOTE: All coatings made on the same day using 70% solids HYDRAFINE clay slip, 14% binder, NH₄OH cut to pH 9.5 at color solids of 45.0%.

Antifoam materials to reduce foaming, wetting agents, dyes and colored pigments, lubricating agents, waxes and other coating additives used in coating compositions for cellulosic web surfaces can be incorporated in the compositions of this invention.

The aqueous graft polymer emulsions made by the practice of of this invention have particular utility as paper and paperboard coating compositions. The aqueous graft polymers can be used as received with no extra steps for dispersion as required with dry grades of isolated soy protein, casein and starches. The proteinaceous content of these graft polymers gives them the most desired characteristics of isolated soy protein in paper coating compositions, i.e., fluidity, good rheology a high coating solids, water retentivity, sheet stiffness, controlled ink holdout, and other desirable properties known to those skilled in the art. The styrene and alkyl acrylate or methacrylate content of the graft polymers gives them properties of total synthetic emulsions used in paper coating compositions, i.e., good sheet brightness, ease of glossing, excellent adhesive strength, controlled viscosity at high solids content, ease of handling, mechanical stability, controlled sheet flexibility, and other desirable properties. The graft polymers cited may also be used as functional barrier coatings, as intermediates in the preparation of water-based inks, as useful adjuncts in all-purpose adhesives, in water clarification, and in many other general adhesives applications known to those skilled in the art.

It will be readily seen from the examples cited that certain improved coating compositions have been provided for the preparation of coated paper and paperboard. The invention is not limited to the specific variations cited in these examples. The broad scope of this invention covers compositions containing a protein substance which has been graft polymerized with styrene and an alkyl acrylate or methacrylate in an aqueous system. Further, it has been found that by using a suitable alkyl acrylate or methacrylate it is possible to produce proteinaceous graft polymer adhesives which exceed the adhesive strength of equivalent amounts of protein or physical mixtures of proteins and various synthetic resins while retaining an excellent balance of other properties necessary for the manufacture of coated paper and paperboard.

We claim:
1. A method of producing a paper coating comprising:
   dispersing a proteinaceous substrate in water, said proteinaceous substrate being a member selected from the class consisting of isolated soy protein and casein,
   adding a seed emulsion to the dispersion of said proteinaceous substrate, said seed emulsion being a member selected from the class consisting of styrene-butadiene polymers, polyvinyl acetate homopolymers and multipolymers, alkyl acrylate and methacrylate homopolymers and multipolymers, polyvinyl chloride and polyvinylidene chloride homopolymers and multipolymers. said seed emulsion being present in an amount of from about 0.01% to about 50% of said resulting graft polymer, the solids content of said dispersion being adjusted to between about 0.01% and about 31%,
   adding a free radical precursor to the dispersion,
   thereafter adding to said dispersion a styrene monomer and a second monomer selected from the class consisting of an alkyl acrylate, an alkyl methacrylate, or a combination thereof wherein the alkyl group has from 1–10 carbon atoms, each of said monomers being added in an amount sufficient to constitute from about 16% to about 34% of the graft polymer resulting from the reaction of said monomers with said proteinaceous substrate, said precursor being added during monomer addition until an amount between about 0.001% and about 10% of the combined monomer weight is achieved,
   maintaining the temperature during monomer addition within the range of 40°C. and 75°C. and until the free monomer content is less than 1% to achieve a graft polymer having a particle size in the range of about 0.05 microns to about 0.25 microns, and
   blending said graft polymer with a pigment to provide a coating having a solids content of from about 15% to about 67%.

* * * * *